US009542320B2

United States Patent
Bert et al.

(10) Patent No.: US 9,542,320 B2
(45) Date of Patent: Jan. 10, 2017

(54) MULTI-NODE CACHE COHERENCY WITH INPUT OUTPUT VIRTUALIZATION

(71) Applicant: Avago Technologies General IP (Singapore) Pte. Ltd, Singapore (SG)

(72) Inventors: Luca Bert, Norcross, GA (US); Sumanesh Samanta, Bangalore (IN); Philip K. Wong, Austin, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 184 days.

(21) Appl. No.: 14/594,326

(22) Filed: Jan. 12, 2015

(65) Prior Publication Data

US 2016/0203080 A1 Jul. 14, 2016

(51) Int. Cl.
*G06F 12/08* (2016.01)
*G06F 3/06* (2006.01)

(52) U.S. Cl.
CPC .......... *G06F 12/0835* (2013.01); *G06F 3/065* (2013.01); *G06F 3/067* (2013.01); *G06F 3/0619* (2013.01); *G06F 3/0665* (2013.01); *G06F 3/0689* (2013.01); *G06F 2212/621* (2013.01)

(58) Field of Classification Search
CPC .... G06F 12/0835; G06F 3/0619; G06F 3/065; G06F 3/0665; G06F 3/067; G06F 3/0689
USPC ............ 711/114, 4, 111, 112, 113, 154, 156; 714/4.11, 5.1, 6.1, 6.3, 6.32
See application file for complete search history.

(56) References Cited

U.S. PATENT DOCUMENTS

| | | | | |
|---|---|---|---|---|
| 6,338,126 B1 * | 1/2002 | Ohran | .................. | G06F 11/2074 707/999.202 |
| 6,928,513 B2 * | 8/2005 | Lubbers | .............. | G06F 11/2064 711/112 |
| 7,366,846 B2 * | 4/2008 | Boyd | .................. | G06F 11/2076 711/133 |
| 7,418,564 B2 * | 8/2008 | Suzuki | ................ | G06F 11/1662 711/161 |
| 7,865,767 B2 * | 1/2011 | Honda | .................... | G06F 3/065 710/38 |
| 8,285,927 B2 * | 10/2012 | Flynn | ...................... | G06F 1/183 711/113 |

(Continued)

OTHER PUBLICATIONS

Fujitsu. "SPARC Enterprise T5440 Server Architecture." White Paper. Jul. 2009. pp. 1-28.

(Continued)

*Primary Examiner* — Stephen Elmore

(57) ABSTRACT

Systems and methods maintain cache coherency between storage controllers using input/output virtualization. In one embodiment, a primary storage controller receives write commands over a virtualized interface, stores the write commands in cache memory, tracks a status of the write commands processed from the cache memory, and stores the status in a portion of the cache memory. A backup storage controller includes a backup cache that receives replications of the write commands via direct memory access operations, and stores the replications of the write commands. The primary storage controller makes the status available to a host system. In response to a failure of the primary storage controller, the backup storage synchronizes with the status from the host system, and resumes I/O operations for the logical volume.

25 Claims, 3 Drawing Sheets

(56) References Cited

U.S. PATENT DOCUMENTS

| | | | |
|---|---|---|---|
| 8,806,115 B1* | 8/2014 | Patel | G06F 12/00 |
| | | | 711/103 |
| 9,251,086 B2* | 2/2016 | Peterson | G06F 12/0868 |
| 2011/0289267 A1* | 11/2011 | Flynn | G06F 1/183 |
| | | | 711/103 |
| 2013/0097367 A1* | 4/2013 | Flynn | G06F 1/183 |
| | | | 711/103 |
| 2014/0115588 A1 | 4/2014 | Traut et al. | |
| 2014/0258615 A1 | 9/2014 | Matsui et al. | |
| 2015/0286541 A1* | 10/2015 | Dain | G06F 11/1469 |
| | | | 711/103 |

OTHER PUBLICATIONS

Microsoft. "Best Practices for Virtualizing and Managing SQL Server." May 2013. pp. 1-92.

* cited by examiner

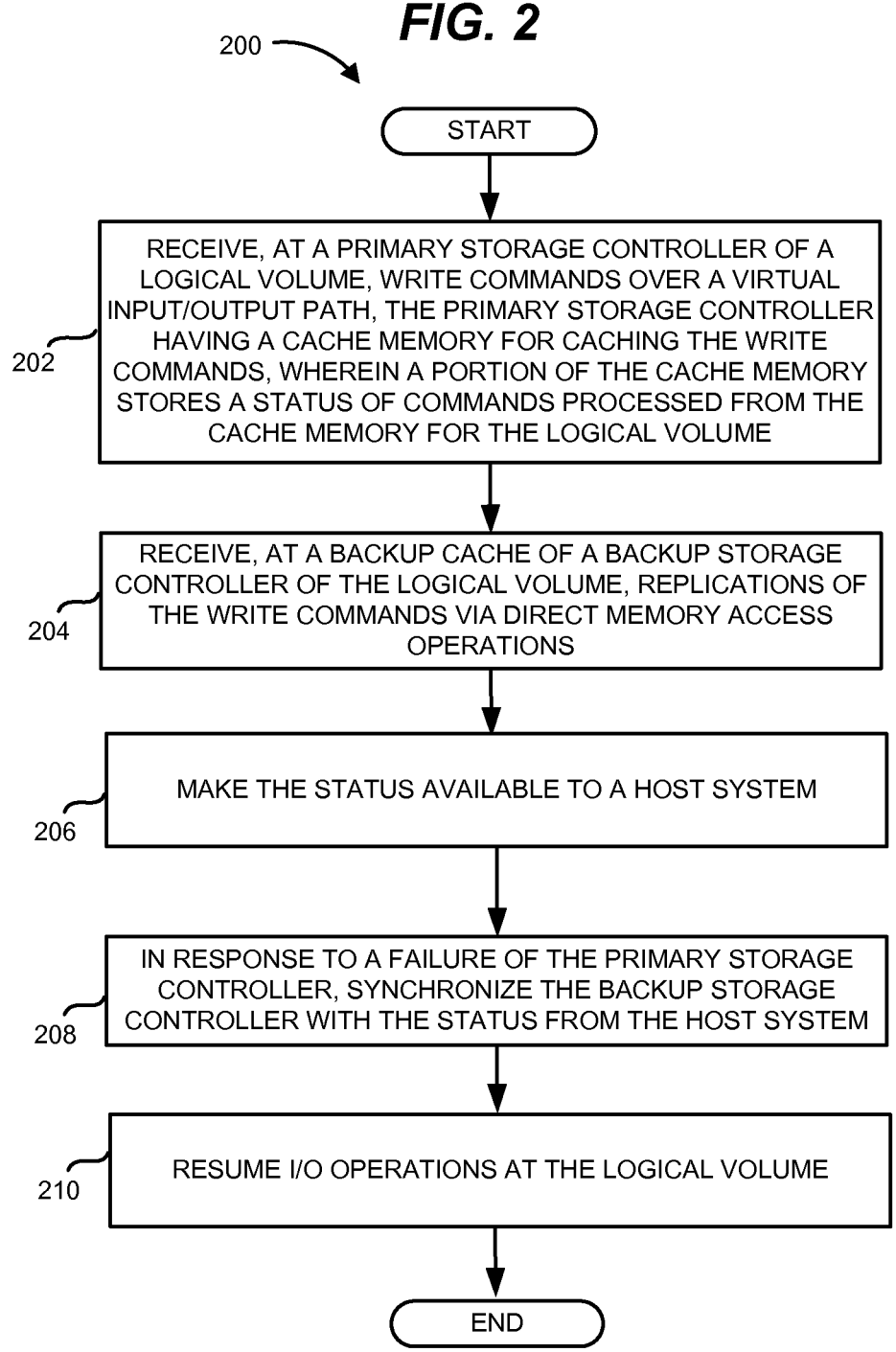

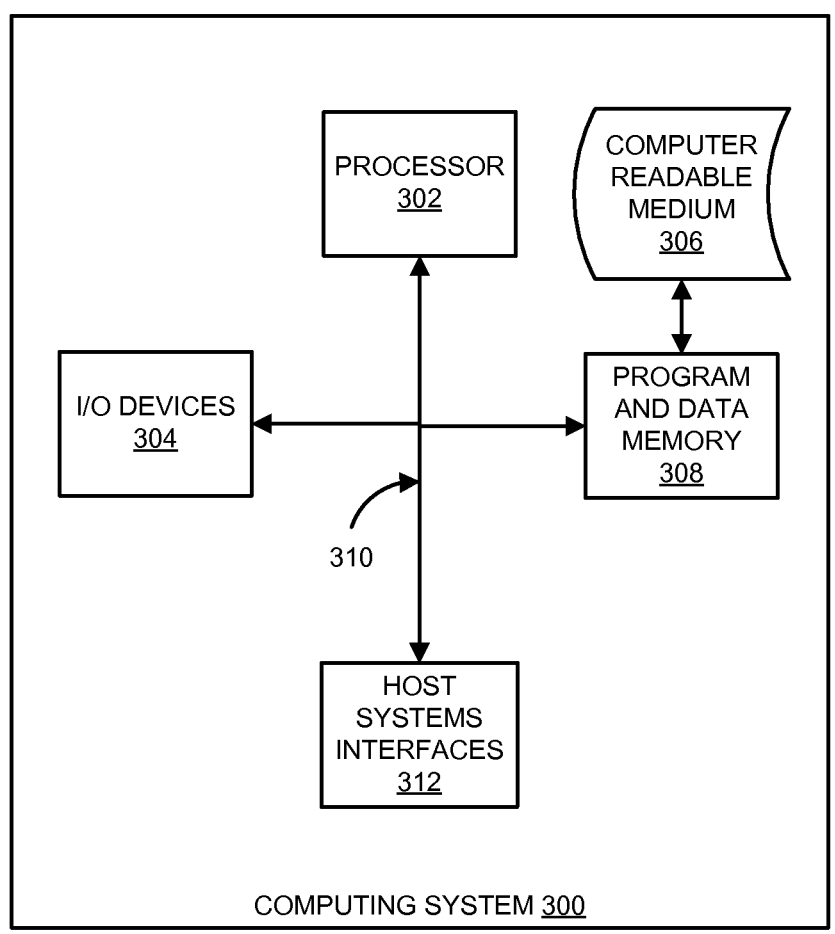

MULTI-NODE CACHE COHERENCY WITH INPUT OUTPUT VIRTUALIZATION

FIELD OF THE INVENTION

The invention generally relates to the field of data storage systems.

BACKGROUND

Storage systems often use cache memory of a storage controller to implement various caching techniques for enhanced read/write performance. For instance, in write back caching, a storage controller temporarily stores write commands in faster performing cache memory and reports the command as complete to the host though it is not actually performed/completed in slower primary storage until a later, more convenient time. While this technique increases input/output (I/O) throughput, data integrity may be compromised if a storage controller with cached write commands fails and is no longer accessible.

High availability storage systems implement redundant components to reduce the impact of a single component within the storage system failing. In such systems, a redundant storage controller may receive cache coherency information from a primary storage controller to ensure data integrity of the storage system in the event that the primary storage controller fails. Cache coherency exchanges between storage controllers in current high availability configurations, such as Storage Area Network (SAN) systems, rely on dedicated channels between the storage controllers or the switched fabric that connects the storage controllers to the common storage unit (e.g., a Redundant Array of Independent Disks (RAID) volume). Unfortunately, these configurations are expensive to implement and the repeated exchange of cache coherency between storage controllers undesirably consumes processing and bandwidth resources of the storage system.

SUMMARY

Systems and methods presented herein provide for maintaining cache coherency between storage controllers using Input/Output Virtualization (IOV). In one embodiment, a primary storage controller receives write commands over a virtualized interface, stores the write commands in cache memory, tracks a status of the write commands processed from the cache memory, and stores the status in a portion of the cache memory. A backup storage controller includes a backup cache that receives replications of the write commands via direct memory access operations, and stores the replications of the write commands. The primary storage controller makes the status available to a host system. In response to a failure of the primary storage controller, the backup storage synchronizes with the status from the host system, and resumes I/O operations for the logical volume.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

FIG. 2 is a flowchart illustrating a method of maintaining cache coherency between storage controllers in an exemplary embodiment.

FIG. 3 illustrates a computing system in which a computer readable medium provides instructions for performing methods herein.

DETAILED DESCRIPTION OF THE FIGURES

Figure 1:
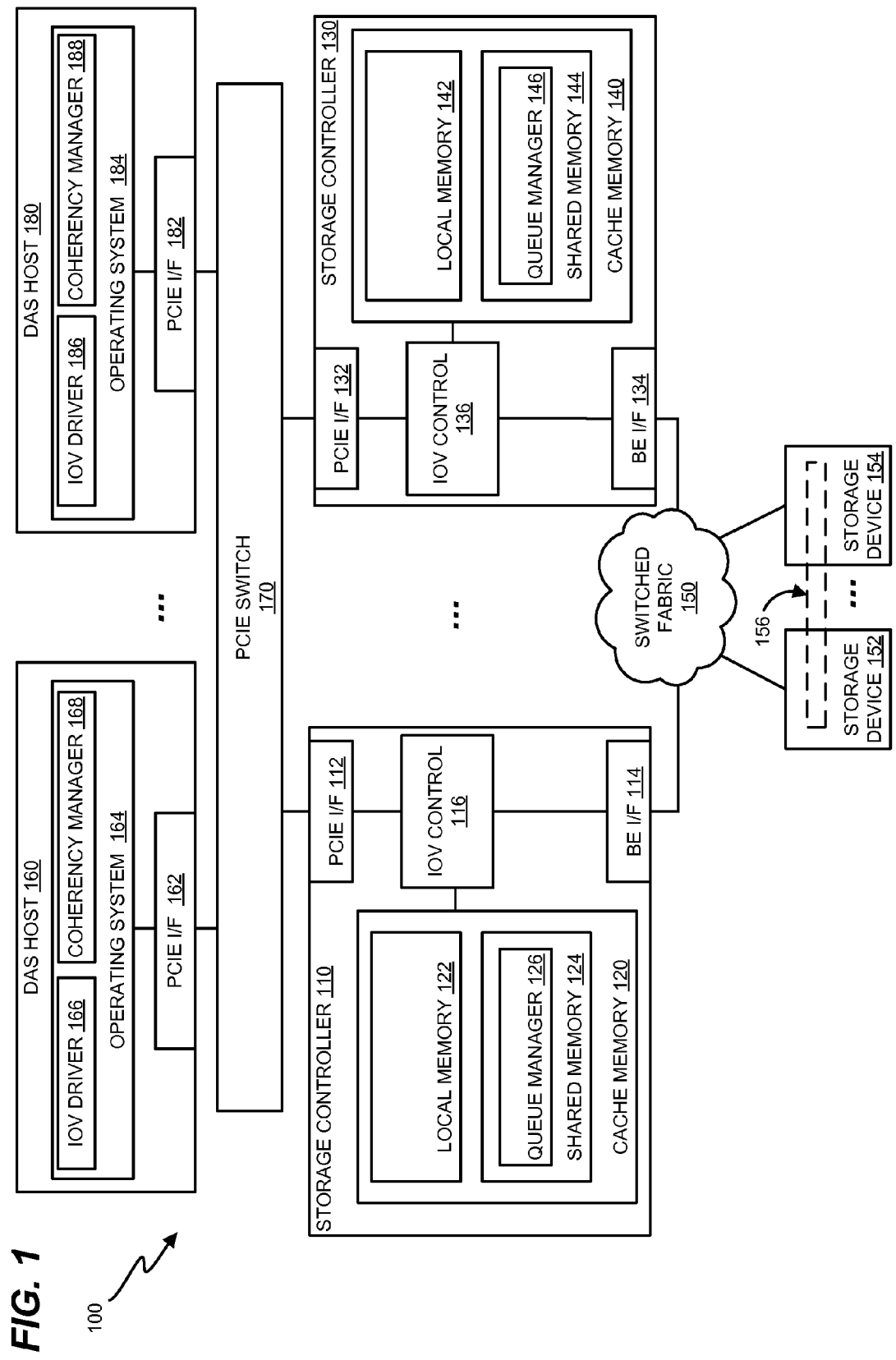
FIG. 1 is a block diagram of a direct attached storage (DAS) system in an exemplary embodiment.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

FIG. 1 is a block diagram of a direct attached storage (DAS) system 100 in an exemplary embodiment. In general, DAS system 100 implements redundancy to tolerate a single point of failure, and includes multiple DAS hosts 160/180, multiple storage controllers 110/130, and multiple storage devices 152-154. DAS host 160/180 is any suitable system or device operable to issue storage commands including requests to read data, write data, erase data, etc. for a logical volume provisioned on storage devices 152-154 that implement the persistent storage capacity for DAS system 100.

Storage controller 110/130 is any suitable device operable to manage communication of data between one or more DAS hosts 160/180 and of one or more storage devices 152-154. Storage controller 110/130 may provide functionality including disk aggregation and redundancy (e.g., RAID), I/O routing, error recovery operations, etc. Storage controller 110/130 includes a frontend Peripheral Component Interconnect Express (PCIe) interface 112/132, backend interface 114/134, IOV control 116/136, and cache memory 120/140. PCIe interface 112/132 receives I/O requests from a DAS host 160/180 for processing by IOV control 116/136 for accessing a logical volume, such as logical volume 156. Storage controller 110/130 performs read and write operations on one or more storage devices 152-154 connected to backend interface 114/134 via switched fabric 150.

Storage controller 110/130 may also be configured in various primary and/or backup configurations for high availability of DAS system 100. Consider, for example, that storage controller 110 is actively managing logical volume 156 provisioned on storage devices 152-154 as the primary storage controller and storage controller 130 acts as a backup storage controller for logical volume 156. As I/O requests are issued by DAS host(s) 160/180 for logical volume 156, storage controller 110 caches data related to the I/O requests in cache memory 120 in accordance with any number of caching techniques. To ensure data integrity and efficient failover, it is desirable that the data in cache memory 120 is replicated at cache memory 140 for use by storage controller 130 in the event that storage controller 110 fails or otherwise becomes unavailable to manage logical volume 156.

In previous DAS-based systems, cache coherency information was exchanged between two storage controllers via the backend interface (e.g., switched fabric). In these systems, when controller A receives an I/O from a host, controller A ships the I/O to controller B for replication, and then receives the I/O back from controller B for symmetry of replication. Thus, a write issued to one node generates, on average, three I/Os on that node for a 3:1 I/O overhead ratio. Moreover, in a typical DAS system, the storage controller is local to the host and may not be shared among multiple hosts, limiting its ability to provide redundant configurations with high availability. But from a programming standpoint, DAS provides some advantages since a storage controller is dedicated and thus directly addressable by the host.

In SAN-based systems, cache coherency information may be exchanged between storage controllers via the backend or dedicated links. These alternatives potentially improve backend traffic but are prohibitively expensive to implement and still incur the same 3:1 I/O overhead ratio described above, or a 2:1 I/O overhead ratio in the case of a dedicated link. Moreover, while the switched frontend of a SAN-based storage system provides multinode redundancy, the storage controllers are abstracted behind the SAN architecture and hosts are unable to address specific storage controllers and, as such, front-end memory addressing is not usable in SAN. This used to be a welcome feature of the SAN design as a SAN host could perform writes to a volume without an understanding of the backend architecture, simplifying the programming. But, the bandwidth of more modern storage devices, such as solid state devices, has increased over traditional hard disk drives to the point that the linear scalability of storage controllers in a SAN fabric is a bottleneck in many SAN storage systems.

DAS system 100 is enhanced with I/O virtualization (IOV) functionality for improved cache coherency management of storage controllers 110/130. In general, IOV relates to a capability of a physical I/O device, such as storage controller 110, to be used by more than one operating system. In DAS system 100, IOV implementation as described in detail below enables redundant storage network configurations not previously possible. More particularly, DAS system 100 retains the benefits of DAS-based addressability of individual nodes while enabling redundancy and high fault tolerance. Details related to the improvement of cache coherence at storage controllers 110/130 will be discussed in more detail with regard to FIG. 2.

In DAS system 100, DAS host 160 and DAS host 180 may each include one or multiple respective operating systems 164/184. Each operating system 164/184 accesses its share of physical components of one or more storage controllers 110/130 using a corresponding IOV driver 166/186 to communicate over virtualized I/O paths. A virtual I/O path may be created between IOV drivers 166/186 and an IOV-enabled physical I/O resource, such as storage controller 110/130, through the use of virtual functions.

In one embodiment, virtual functions used by DAS hosts 160/180 and/or storage controllers 110/130 are supported with functionality described by the Peripheral Component Interconnect Special Interest Group (PCI-SIG) in the Single Root IOV (SR-IOV) and/or Multi-Root (MR-IOV) specifications. These extensions to the PCIe protocol are designed to increase the effective hardware utilization of a PCIe device. Thus, IOV capability of DAS system 100 may be compliant, or partially compliant, with either or both of the SR-IOV/MR-IOV standards to leverage the use of PCIe hardware.

DAS hosts 160/180 include PCIe interfaces 162/182 that couple to PCIe interfaces 112/132 of storage controllers 110/130 via PCIe switch 170. DAS hosts 160/180, or a related management layer, may be configured to discover and configure root complexes, switches, bridges, and endpoints of a connected fabric. The configuration may include an abstraction of an I/O resource into multiple virtual functions that map an underlying communication infrastructure to a space in memory (e.g., a memory management configuration at the host-end (not shown)). Additionally, a physical I/O resource may be allocated to one or more virtual functions that are partitioned and/or assigned to operating systems 164/184 in a variety of combinations by matter of design choice.

Storage controller 110/130 is IOV-enabled with IOV control 116/136 operable to support virtualization of I/O operations and I/O resources of storage controller 110/130 with virtual functions as described above. In DAS system 100, the physical PCIe front end interfaces 112/132 of respective storage controllers 110/130 may each be partitioned into multiple virtual functions so that each storage controller 110/130 is accessible by multiple DAS hosts 160/180 (and/or multiple operating systems 164/184) but appear as a dedicated device from the perspective of a single operating system 164/184. Advantageously, DAS programming functions may be implemented in an any-to-any configuration whereby any DAS host 160/180 may access any storage controller 110/130.

IOV control 116/136 also manages functions of cache memory 120/140. Cache memory 120/140 of storage controller 110/130 comprises any system, component, or device that is able to store data for high speed access. Some examples of cache memory 120/140 include, Random Access Memory (RAM), Non-Volatile Dynamic RAM (NVDRAM), flash memory, etc. Cache memory 120/140 includes local memory 122/142, shared memory 124/144, and queue manager 126/146. Local memory 122/142 is operable to store data of I/O requests issued by DAS host 160/180 for logical volumes actively managed by storage controller 110/130. Shared memory 124/144 is operable to store data related to failover functionality. Shared memory 124/144 includes queue manager 126/136 operable to track caching operations in local memory 122/142. As will be described in additional detail below, configuration of cache memory 120/140 supports local caching functions for improved I/O processing as well as backup caching for another storage controller for efficient failover. Components of cache memory 120/140 may be separate, integral, or some combination thereof. The size of shared memory 124/144 may be defined at boot time by matter of design choice to control the amount of data that may be synchronized between storage controllers 110/130 before a disk write is forced.

Because DAS hosts 160/180 implement DAS programming, an IOV driver 166/186 may issue an I/O to one controller (e.g., storage controller 110), and also move data that replicates the I/O to another controller (e.g., storage controller 130) using OS-assisted command replication features. For example, DAS host 160/180 may issue an I/O to a primary storage controller (e.g., storage controller 110) to be processed/cached/completed as normal, and simultaneously move data that replicates that I/O directly to memory (e.g., shared memory 144) of a backup controller (e.g., controller 130) using a direct a direct memory access (DMA) operation between memory of DAS host 160/180 and shared memory 144. This advantageously enables IOV drivers 166/186 to replicate data issued to a primary storage controller in the memory of the backup storage controller without cache coherency processing/logic implemented in the backup storage controller for handling the replication. Additionally, cache coherency exchanges between storage controllers may be eliminated, and, as described in detail below, coherency logic may be performed at the host side with coherency manager 168/188.

In one embodiment, IOV control 116/136 exposes a portion of cache memory 120/140 to one or more operating systems 164/184 by allocating shared memory 124/144 to a Base Register Address (BAR) in a configuration space of a virtual function. The virtual function of shared memory 124/144 is partitioned and/or assigned such that it is directly accessible to either or both DAS hosts 160/180 as a dedicated virtual I/O path. DAS hosts 160/180 therefore mirror storage controllers 110/130 by replicating data directly into shared memory 124/144 of the appropriate storage controller 110/130 using DMA functionality. Additionally, DAS hosts 160/180 periodically retrieve data in queue manager 126/146 that is similarly exposed/shared by DAS hosts 160/180 for up-to-date information of I/O commands processed from local memory 122. Because DAS hosts 160/180 access shared memory 124/144 directly, coherency management programming/logic may be eliminated at storage controller 110/130 and moved to a centralized coherency manager 168/188 at the host-end. This provides several advantages because each DAS host 160/180 may replicate data among multiple storage controllers (e.g., even piecemeal across several controllers) by any manner of design choice without an exponential increase in processing costs related to each storage controller being aware of its mirror counterparts. Moreover, given that servers often run on powerful, multi-core processors and often outnumber storage controllers, the impact of cache coherency processing is diluted when performed at the host-end.

In another embodiment, IOV control 116/136 is configured to identify and process two different types of commands issued by IOV drivers 166/186: a regular write command that is processed for a logical volume as normal (e.g., cached in local memory 122/142, written to storage devices 152-154 etc.), and a mirror write command that causes storage controller 110/130 to store data related to a write command in shared memory 124/144 without processing the command for a logical volume. IOV drivers 166/186 therefore issue the regular write and the mirror write to the appropriate storage controllers (e.g., storage controller 110 and 130, respectively) which are processed by IOV control 116/136 and stored in cache memory 120/140 accordingly. In this embodiment, DAS hosts 160/180 may communicate over virtualized interfaces (e.g., PCIe interfaces 112/132) but do not have direct virtualized paths to memory components of storage controllers 110/130. Information of queue manager 126/146 may be periodically communicated between IOV control 116/136 and DAS hosts 160/180 over the virtualized interfaces (e.g., responsive to requests, at predetermined intervals, etc.).

It will be appreciated that numerous primary/backup configurations of storage controllers 110/130 are possible and, as such, the particular nodes addressed by the IOV driver 166/186 vary as a matter of design choice. Redundant configurations may include active-active or active-passive modes, and may further be configured to provide primary and/or backup I/O management with any combination of storage controllers and logical volumes. For instance, storage controller 130 may actively manage other logical volumes (not shown) that are provisioned on storage devices 152-154 while providing backup functionality for storage controller 110 and logical volume 156, or vice versa. Additionally, it will be appreciated that storage controllers 110/130 may perform any number of caching techniques in respective cache memories 120/140, including write-through modes, write-back modes, etc.

As used herein, a logical volume comprises allocated storage space and data available at one or more storage devices. A logical volume may be implemented on any number of storage devices as a matter of design choice. Switched fabric 150 may include a SAS fabric, a Fibre channel fabric, expanders, etc. Storage devices 152-154 may comprise magnetic hard disks, solid state drives, optical media, etc. compliant with protocols for SAS and/or SATA, and need not be dedicated to only one logical volume.

Furthermore, it will also be appreciated that other types of virtualization platforms, components, and layers may be operable with DAS system 100 not shown for the sake of brevity. The particular arrangement, number, and configuration of components described herein with regard to FIG. 1 is exemplary and non-limiting.

FIG. 2 is a flowchart illustrating a method 200 of maintaining cache coherency of storage controllers with a DAS host in an exemplary embodiment. The steps of method 200 are described with reference to storage system 100 of FIG. 1, but those skilled in the art will appreciate that method 200 may be performed in other systems. The steps of the flowchart(s) described herein are not all inclusive and may include other steps not shown. The steps described herein may also be performed in an alternative order.

Assume, for method 200, that DAS hosts 160/180 have discovered and enumerated configuration spaces shared by storage controllers 110/130. Therefore, IOV drivers 166/186 issue I/Os on behalf of operating systems 164/184 using virtual functions in the configuration spaces identified in the attached PCIe root complex. Further assume that, initially, storage controllers 110 and 130 are assigned primary and backup, respectively, for logical volume 156. As such, storage controller 110 associates its PCIe interface 112 with multiple virtual functions to allow any DAS host 160/180 to target logical volume 156 in redundant fashion. Virtual functions may be similarly mapped for PCIe interface 132, shared memory 124, and shared memory 144 to provide independent, direct virtualized I/O access of these physical resources from any DAS host 160/180.

In step 202, a primary storage controller of a logical volume (e.g., storage controller 110 and logical volume 156, respectively) receives write commands over a virtualized I/O path. Over time, data may accumulate in local memory 122 in accordance with any of a variety of caching techniques implemented at storage controller 110. At a later time, storage controller 110 may flush one or more write requests from local memory 122 to persistently store the data in logical volume 156. A portion (e.g., shared memory 124) of cache memory 120 stores a status of commands processed from local memory 122 for logical volume 156. As such, queue manager 126 of shared memory 124 may be operable to track content stored/flushed in local memory 122 for logical volume 156.

In one embodiment, queue manager 126 includes a circular data buffer in shared memory 124 that is exposed to one or multiple operating systems 164/184 over a virtual I/O path(s). The control set for the buffer manages entries of a queue space and is accessible by DAS host 160/180 via virtual functions. For example, the queue manager 126 may include a Producer-Consumer (P-C) queue space that receives entries when a producer (e.g., IOV driver(s) 166/186) writes a command to local memory 122 and retires entries when a consumer (e.g., storage controller 110) reads a command from local memory 122 for processing for logical volume 156. The producer-consumer queues increment counters within the queues to ensure queue manager 126 and/or the tracking information therein is up-to-date with respect to the data stored by logical volume 156 and with respect to cache entries of storage controller 110 relating to logical volume 156.

In step 204, a backup cache (e.g., shared memory 144) of a backup storage controller (e.g., storage controller 130) receives replications of the write commands via DMA operations. DAS host(s) 160/180 may issue write commands to storage controller 110 at or about the same time that corresponding replications of the write commands are moved to shared memory 144 of storage controller 130 using DMA capability of DAS host 160/180. The operating system assisted command replication and DMA capability of DAS host 160/180 enables a minimum possible 1:1 I/O overhead ratio (i.e., one write sent over frontend and one write sent over backend) while achieving replicated data stored at the backup storage controller (e.g., storage controller 130). Moreover, processing at storage controllers 110/130 may be simplified as the replicated I/O may simply be moved into memory of the backup storage controller without issuing a separate I/O command to the backup storage controller.

In step 206, storage controller 110 makes the status of commands processed from local memory 122 for logical volume 156 available to DAS host 160/180. As described previously, queue manager 126 within shared memory 124 of storage controller 110 may be exposed to and shared by DAS hosts 160/180 using virtual functions and virtualized I/O paths. As such, DAS host 160/180 may periodically access information of queue manager 126 for retrieval of the status from shared memory 124. DAS host 160/180 may retrieve the status in predefined intervals, in response to a triggering event, etc., as a matter of design choice. The status information may be stored/shared among multiple operating systems 164/184 and/or DAS hosts 160/180. Similarly, coherency manager 168/188 logic may be distributed/shared among multiple operating systems 164/184 and/or DAS hosts 160/180.

In step 208, responsive to a failure of storage controller 110, storage controller 130 synchronizes with the status from DAS host 160/180. Backup storage controller 130 is synchronized based on cache entry changes indicated by the status stored in shared memory 124 of storage controller 110. Coherency manager 168/188 may apply the most recently retrieved status to the replicated commands stored in shared memory 144 of storage controller 130. For instance, in a P-C queue implementation, coherency manager 168/188 identifies the most recent copy of the P-C queue from queue manager 126 and inserts the copy into queue manager 146. Since the write commands issued to storage controller 110 have already been replicated at shared memory 144 of storage controller 130, the status rewinds queue manager 146 to the last known processed I/O and the subsequent commands in shared memory 144 may be correctly processed without data corruption.

Then, in step 210, storage controller 130 resumes I/O operations at logical volume 156. Being properly synchronized, storage controller 130 may assume ownership and remain the primary storage controller of logical volume 156 until a suitable failback process is completed. It may be possible for some cache entries to have been processed for the logical volume between retrieval of the status from the primary storage controller (e.g., step 206) and synchronization of the backup controller using the status (e.g., step 208). In other words, although the status may be retrieved periodically, it is possible it is not completely up-to-date. Nonetheless, storage controller 130 is able to issue the correct commands from shared memory 144 by processing from an initialization point based on the status, and simply re-processing the writes from shared memory 144, harmlessly overwriting data at logical volume 156. When the status is periodically retrieved, any re-processing of such commands by storage controller 130 is likely to be minimal.

Using method 200, efficient synchronization and failover of storage controllers 110/130 is provided without any exchange between the primary storage controller (e.g., storage controller 110) and the backup storage controller (e.g., storage controller 130). And, architecture and programming of storage controller 110/130 is simplified since it need not coordinate or communicate cache coherency information. Furthermore, the IOV functionality and virtualized paths of DAS system 100 enable a front-end DAS programming model where resources are shared and visible through virtual functions in an any-to-any connection between DAS hosts 160/180 and storage controllers 110/130. DAS system 100 is thus highly flexible and redundant. For instance, if one of DAS hosts 160/180 fails, both the primary and the backup storage controller retain their functionality. When a new host takes control, it may simply retrieve the status (e.g., P-C queue) from the queue manager (e.g., queue manager 126) of the primary controller (e.g., storage controller 110) and resume I/O processing where it left off.

It will be appreciated that the synchronization step described above may occur in response to a detected failure of the primary storage controller or in response to another event or predefined period of time. It will further be appreciated that component failures may be caused for any number of reasons and may be detected by DAS host 160/180 or other components in a variety of ways. For example, the failure may relate to a loss of power, a loss of communication, a change to the DAS system 100 configuration (e.g., change of ownership), etc.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 3 illustrates a computing system 300 in which a computer readable medium 306 provides instructions for performing any of the methods disclosed herein.

Furthermore, embodiments of the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computing system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/Output or I/O devices 304 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A storage system comprising:
    a primary storage controller configured to receive write commands over a virtualized interface, to store the write commands in cache memory, to track a status of the write commands processed from the cache memory, and to store the status in a portion of the cache memory; and
    a backup storage controller that includes a backup cache configured to receive replications of the write commands via direct memory access (DMA) operations, and to store the replications of the write commands;
    wherein the primary storage controller is configured to make the status available to a host system; and
    wherein, in response to a failure of the primary storage controller, the backup storage controller is configured to synchronize with the status from the host system, and to resume I/O operations at the logical volume.

2. The system of claim 1, wherein:
    the backup cache of the backup storage controller is associated with a virtual function that enables the host system to directly access the backup cache using DMA.

3. The system of claim 1, wherein:
    the portion of the cache memory of the primary storage controller is associated with a virtual function that enables the host system to directly access the status stored in the portion of the cache memory.

4. The system of claim 1, wherein:
    the primary storage controller includes a circular buffer operable to increment a producer queue in response to reception of the write commands, and to increment a consumer queue in response to processing of the write commands for the logical volume, wherein information of the producer queue and the consumer queue collectively form the status that is stored in the portion of the cache memory.

5. The system of claim 1, wherein:
    the host system includes a plurality of direct attached storage (DAS) hosts, each DAS host having one or more operating systems with corresponding drivers to issue the write commands and to move the replications of the write commands using DMA operations.

6. The system of claim 1, wherein:
    the write commands and the replications of the write commands are received substantially simultaneously.

7. A method operable in a storage system, the method comprising:
    receiving, at a primary storage controller of a logical volume, write commands over a first virtualized Input/Output (I/O) path, the primary storage controller having cache memory for caching the write commands, wherein a portion of the cache memory stores a status of commands processed from the cache memory for the logical volume;
    receiving, at a backup cache of a backup storage controller of the logical volume, replications of the write commands via direct memory access (DMA) operations;
    making the status available to a host system;
    responsive to a failure of the primary storage controller, synchronizing the backup cache of the backup storage controller with the status from the host system; and
    resuming I/O operations at the logical volume with the backup storage controller.

8. The method of claim 7, further comprising:
    associating the backup cache of the backup storage controller with a virtual function that enables the host system to directly access the backup cache using DMA operations.

9. The method of claim 7, further comprising:
    associating the portion of the cache memory of the primary storage controller with a virtual function that enables the host system to directly access the status stored in the portion of the cache memory.

10. The method of claim 7, further comprising:
    incrementing a producer queue of a circular buffer in the primary storage controller in response to receiving the write commands;
    incrementing a consumer queue of the circular buffer in the primary storage controller in response to the processing of the write commands for the logical volume;
    determining the status based on the producer queue and the consumer queue; and
    storing the status in the portion of the cache memory of the primary storage controller.

11. The method of claim 7, wherein:
    the write commands and the replications of the write commands are received from one or more direct attached storage (DAS) hosts, each DAS host having one or more operating systems with corresponding drivers to issue the write commands and to move the replications of the write commands using DMA operations.

12. The method of claim 7, wherein:
    the write commands and the replications of the write commands are received substantially simultaneously.

13. A non-transitory computer readable medium embodying programmed instructions which, when executed by one or more processors, direct the one or more processors to:
    receive, at a primary storage controller of a logical volume, write commands over a first virtualized Input/Output (I/O) path, the primary storage controller having cache memory for caching the write commands, wherein a portion of the cache memory stores a status of commands processed from the cache memory for the logical volume;
    receive, at a backup cache of a backup storage controller of the logical volume, replications of the write commands via direct memory access (DMA) operations;
    make the status available to a host system;

in response to a failure of the primary storage controller, synchronize the backup cache of the backup storage controller with the status from the host system; and resume I/O operations at the logical volume with the backup storage controller.

14. The medium of claim 13, wherein:
the instructions further direct the one or more processors to:
associate the backup cache of the backup storage controller with a virtual function that enables the host system to directly access the backup cache using DMA operations.

15. The medium of claim 13, wherein:
the instructions further direct the one or more processors to:
  associate the portion of the cache memory of the primary storage controller with a virtual function that enables the host system to directly access the status stored in the portion of the cache memory.

16. The medium of claim 13 wherein:
the instructions further direct the one or more processors to:
  increment a producer queue of a circular buffer in the primary storage controller in response to receiving the write commands;
  increment a consumer queue of the circular buffer in the primary storage controller in response to the processing of the write commands for the logical volume;
  determine the status based on the producer queue and the consumer queue; and
  store the status in the portion of the cache memory of the primary storage controller.

17. The medium of claim 13 wherein:
the write commands and the replications of the write commands are received from one or more direct attached storage (DAS) hosts, each DAS host having one or more operating systems with corresponding drivers to issue the write commands and to move the replications of the write commands using DMA operations.

18. The medium of claim 13 wherein:
the write commands and the replications of the write commands are received substantially simultaneously.

19. A system comprising:
a plurality of direct attached storage (DAS) hosts configured to associate Input/Output Virtualization (IOV) functions with a plurality of storage controllers, and to replicate write commands at a first storage controller and a second storage controller via the IOV functions;
the DAS hosts further configured to retrieve a status of cached write commands from the storage controllers using the IOV functions, and to apply the status to respective backup storage controllers using the IOV functions.

20. The system of claim 19 wherein:
the DAS hosts further configured to retrieve the status periodically, and to apply the status to coordinate cache coherency information among the storage controllers in response to a failover event.

21. The system of claim 19 wherein:
the DAS hosts further configured to maintain cache coherency among the storage controllers with logic disposed at the DAS hosts, and to eliminate exchanges of cache coherency information between the storage controllers.

22. The system of claim 19 wherein:
the DAS hosts are interconnected with the storage controllers via respective Peripheral Component Interconnect Express (PCIe) interfaces; and
the IOV functions are based at least in part on the Single Root-Input Output Virtualization (SR-IOV) standard.

23. A host of a storage system with direct attached storage (DAS) programming:
the host configured to issue a first type of write instruction that causes a primary storage controller to process data of the write instruction for a logical volume, and to issue a second type of write instruction that causes a backup storage controller to store data of the write instruction in a local cache;
the host further configured to track information of the data processed by the primary storage for the logical volume, and, in response to a failover from the primary storage controller to the backup storage controller, to direct the backup storage controller to begin processing commands from the local cache based on the tracked information.

24. The host of claim 23, wherein:
the host further configured to issue subsequent commands to the backup storage as the first type of write instruction to cause the backup storage controller to process the commands for the logical volume.

25. The system of claim 23, wherein:
the host further configured to communicate with the primary storage controller and the backup storage controller with Input/Output Virtualization (IOV).

* * * * *